(12) United States Patent
Bando et al.

(10) Patent No.: US 10,259,488 B2
(45) Date of Patent: Apr. 16, 2019

(54) STEERING SYSTEM

(71) Applicant: JTEKT CORPORATION, Osaka-shi, Osaka (JP)

(72) Inventors: Yuki Bando, Shiki-gun (JP); Akihisa Umetani, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/947,040

(22) Filed: Apr. 6, 2018

(65) Prior Publication Data
US 2018/0297628 A1  Oct. 18, 2018

(30) Foreign Application Priority Data
Apr. 14, 2017 (JP) ................. 2017-080215

(51) Int. Cl.
| | |
|---|---|
| *F16H 1/04* | (2006.01) |
| *B62D 3/12* | (2006.01) |
| *F16C 33/04* | (2006.01) |
| *F16H 55/28* | (2006.01) |
| *F16C 29/02* | (2006.01) |

(52) U.S. Cl.
CPC ............. *B62D 3/123* (2013.01); *B62D 3/12* (2013.01); *F16C 29/02* (2013.01); *F16C 33/046* (2013.01); *F16H 55/285* (2013.01)

(58) Field of Classification Search
CPC ...... F16C 29/02; F16C 33/20; F16C 2326/24; F16C 29/002; B62D 3/12
See application file for complete search history.

(56) References Cited

U.S. PATENT DOCUMENTS

| | | | |
|---|---|---|---|
| 7,220,056 B2* | 5/2007 | Kubota ................... | B62D 1/16 384/215 |
| 7,665,747 B2* | 2/2010 | Arlt ........................ | B62D 3/12 280/93.514 |

(Continued)

FOREIGN PATENT DOCUMENTS

| | | |
|---|---|---|
| EP | 1911658 A1 | 4/2008 |
| EP | 2829457 A1 | 1/2015 |

(Continued)

OTHER PUBLICATIONS

Sep. 12, 2018 extended Search Report issued in European Patent Application No. 18166752.8.

*Primary Examiner* — Jake Cook
(74) *Attorney, Agent, or Firm* — Oliff PLC

(57) ABSTRACT

A steering system includes a rack shaft, a tubular rack housing, and a tubular rack bushing. The rack bushing is interposed between the outer surface of the rack shaft and the inner surface of the rack housing. The rack bushing supports the rack shaft such that the rack shaft is slidable in the axial direction. The rack housing includes an annular groove on its inner surface. The rack bushing includes a collar, a through slit, and first non-through slits. The collar protrudes radially outward from substantially the entire circumference of the rack bushing. The collar is fitted into the annular groove. The through slit passes through the rack bushing in the axial direction. Each first non-through slit extends in the axial direction such that the first non-through slit passes through a portion of the rack bushing whose axial position corresponds to the axial position of the collar.

8 Claims, 5 Drawing Sheets

(56) References Cited

U.S. PATENT DOCUMENTS

| | | | | |
|---|---|---|---|---|
| 8,272,785 | B2* | 9/2012 | Hirose | B62D 3/12 |
| | | | | 384/215 |
| 8,429,991 | B2* | 4/2013 | Kim | B62D 3/12 |
| | | | | 180/427 |
| 9,279,450 | B2* | 3/2016 | Zaike | F16C 27/063 |
| 2002/0085778 | A1* | 7/2002 | Mena | B62D 3/12 |
| | | | | 384/276 |
| 2004/0076353 | A1* | 4/2004 | Kubota | B62D 1/16 |
| | | | | 384/276 |
| 2009/0000853 | A1* | 1/2009 | Hirose | B62D 3/12 |
| | | | | 180/400 |
| 2010/0278467 | A1* | 11/2010 | Hirose | B62D 3/12 |
| | | | | 384/283 |
| 2012/0237146 | A1* | 9/2012 | Tange | F16C 27/063 |
| | | | | 384/37 |
| 2015/0204381 | A1* | 7/2015 | Zaike | F16C 27/063 |
| | | | | 384/202 |
| 2016/0059883 | A1 | 3/2016 | Mizutani et al. | |
| 2017/0009806 | A1* | 1/2017 | Ikeda | F16C 29/02 |
| 2017/0130769 | A1* | 5/2017 | Ikeda | B62D 1/20 |

FOREIGN PATENT DOCUMENTS

| | | |
|---|---|---|
| EP | 2881304 A1 | 6/2015 |
| GB | 2 522 501 A | 7/2015 |
| JP | 5888433 B2 | 3/2016 |

* cited by examiner

STEERING SYSTEM

INCORPORATION BY REFERENCE

The disclosure of Japanese Patent Application No. 2017-080215 filed on Apr. 14, 2017, including the specification, drawings and abstract, is incorporated herein by reference in its entirety.

BACKGROUND OF THE INVENTION

1. Field of the Invention

The invention relates to steering systems.

2. Description of the Related Art

A steering system to steer steered wheels of a vehicle is known in the related art (see Japanese Patent No. 5888433, for example). The steering system includes a steering operation shaft, a housing, and a steering operation shaft bushing. The steering operation shaft extends in a vehicle width direction and serves to steer the steered wheels. The steering operation shaft is a shaft member that moves in its axial direction so as to change the orientation of the steered wheels. The housing is a cylindrical member including an insertion hole through which the steering operation shaft is inserted. The housing holds the steering operation shaft such that the steering operation shaft is movable in the axial direction.

The steering operation shaft bushing is a cylindrical member. The steering operation shaft bushing is interposed between the inner surface of the housing and the outer surface of the steering operation shaft in a region of the insertion hole of the housing adjacent to an axial end of the housing. The steering operation shaft bushing supports the steering operation shaft inserted through the insertion hole of the housing, such that the steering operation shaft is slidable in the axial direction. The steering operation shaft bushing may include, at its first axial end, a collar protruding radially outward from substantially the entire circumference of the first axial end. The collar is fitted into an annular groove on the inner surface of the housing. This prevents disengagement of the steering operation shaft bushing from the housing in the axial direction.

The steering operation shaft bushing provided with the collar includes a through slit passing through the steering operation shaft bushing in the axial direction. The through slit is provided at at least one location on the steering operation shaft bushing in a circumferential direction thereof. When the steering operation shaft bushing is assembled to the housing, circumferential end faces of the steering operation shaft bushing facing each other circumferentially, with the through slit located therebetween, abut against each other. This reduces the steering operation shaft bushing in diameter. The steering operation shaft bushing reduced in diameter is inserted into the housing until the collar is fitted into the annular groove.

When the steering operation shaft bushing is provided with through slits at two or more locations on the steering operation shaft bushing in the circumferential direction thereof, however, the steering operation shaft bushing is separated into two or more bushing pieces. This complicates operations involved in assembling the steering operation shaft bushing to the housing. The bushing pieces are allowed to deviate to one side in the circumferential direction. This may cause the steering operation shaft bushing to wear unevenly or cause the steering operation shaft and the steering operation shaft bushing to hit against each other to produce sounds.

When the steering operation shaft bushing is provided with only one through slit, the above-described problems, such as complicated operations involved in assembling the steering operation shaft bushing to the housing and uneven wearing of the steering operation shaft bushing, do not occur. In this case, the steering operation shaft bushing will surely have a portion where the outer diameter of the steering operation shaft bushing is reduced by a circumferential width of the through slit, but at the same time, the steering operation shaft bushing will also have a portion where the outer diameter of the steering operation shaft bushing is not reduced (in particular, a portion deviated by 90 degrees relative to the above-mentioned portion where the outer diameter is reduced by the circumferential width of the through slit). If the outer diameter of the steering operation shaft bushing is not reduced as a whole, it will be difficult to insert the steering operation shaft bushing into the housing until the collar is fitted into the annular groove of the housing. Thus, merely providing only one through slit still makes it difficult to assemble the steering operation shaft bushing to the housing.

SUMMARY OF THE INVENTION

An object of the invention is to provide a steering system that reliably enables a steering operation shaft bushing to be assembled to a housing without separating the steering operation shaft bushing into two or more bushing pieces.

A steering system according to an aspect of the invention includes a steering operation shaft, a tubular housing, and a tubular steering operation shaft bushing. The steering operation shaft is coupled to a steered wheel. The steering operation shaft is configured to move in an axial direction thereof so as to change an orientation of the steered wheel. The housing includes an insertion hole through which the steering operation shaft is disposed. The housing holds the steering operation shaft such that the steering operation shaft is movable in the axial direction. The steering operation shaft bushing is interposed between an outer surface of the steering operation shaft and an inner surface of the housing in a region of the insertion hole adjacent to an axial end of the housing. The steering operation shaft bushing supports the steering operation shaft such that the steering operation shaft is slidable in the axial direction. The housing includes an annular groove on the inner surface of the housing. The steering operation shaft bushing includes a collar, a through slit, and at least one first non-through slit. The collar protrudes radially outward from substantially an entire circumference of the steering operation shaft bushing. The collar is fitted into the annular groove. The through slit passes through the steering operation shaft bushing in the axial direction. The at least one first non-through slit extends in the axial direction such that the at least one first non-through slit passes through a portion of the steering operation shaft bushing whose axial position corresponds to an axial position of the collar. The at least one first non-through slit is closed at at least one of axial ends of the steering operation shaft bushing.

This arrangement enables the through slit and the at least one first non-through slit of the steering operation shaft bushing to be reduced in circumferential width so as to reduce the outer diameter of the collar across its entire circumference. The steering operation shaft bushing is provided with only one through slit. This makes it unnecessary to separate the steering operation shaft bushing into two or more bushing pieces. Consequently, this arrangement reliably enables the steering operation shaft bushing to be assembled to the housing without separating the steering operation shaft bushing into two or more bushing pieces.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A configuration of a steering system 1 according to an embodiment of the invention will be described with reference to FIGS. 1 to 9. The steering system 1 includes a rack shaft 13. The rack shaft 13 is a steering operation shaft extending in an axial direction A. The steering system 1 causes the rack shaft 13 to move in the axial direction A. Thus, the steering system 1 steers steered wheels 18 each coupled to an associated one of the ends of the rack shaft 13.

Figure 1:
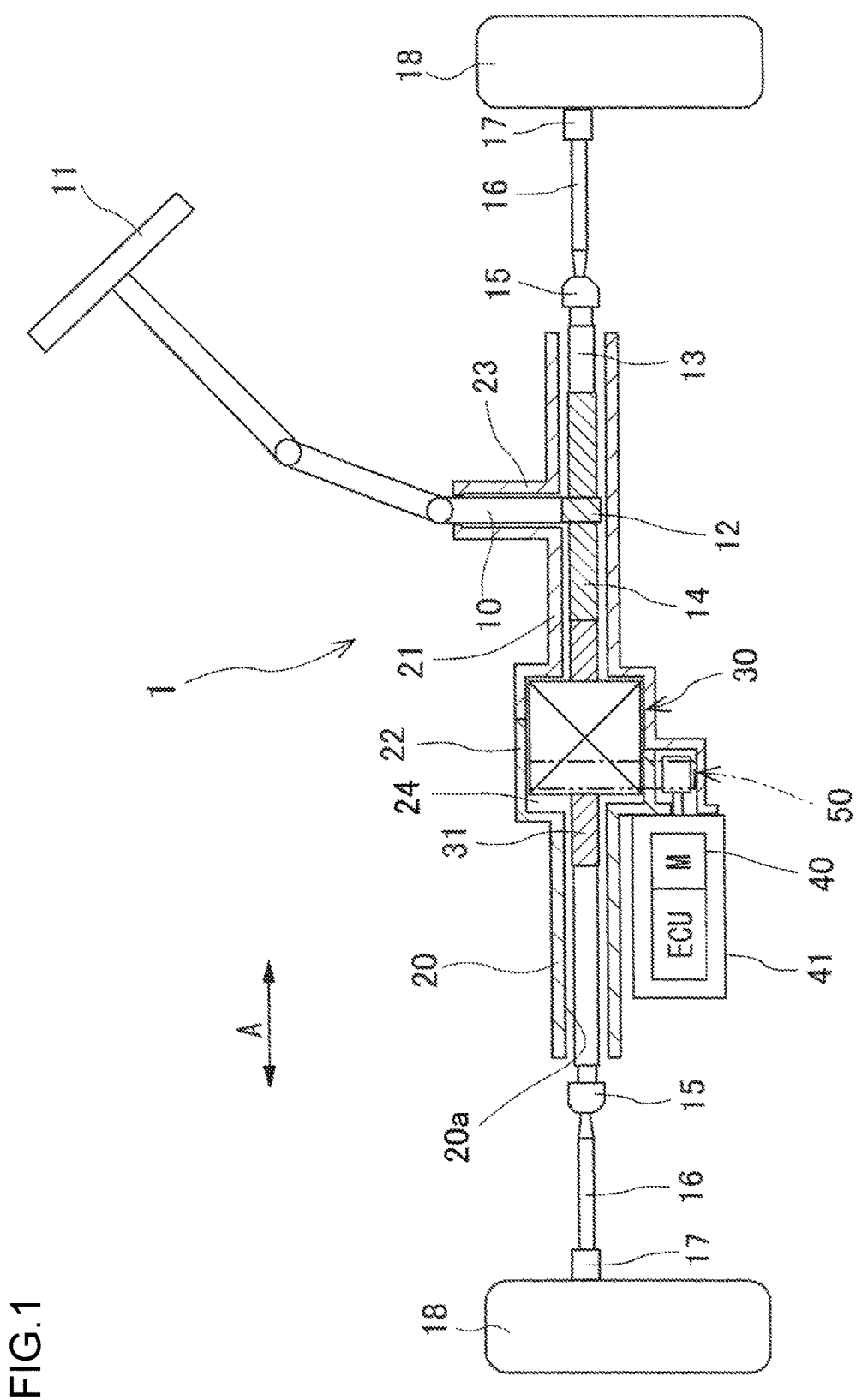
FIG. 1 is a diagram illustrating an overall configuration of a steering system according to an embodiment of the invention.

As illustrated in FIG. 1, the steering system 1 includes a steering shaft 10. A steering wheel 11 is coupled to a first end of the steering shaft 10. The steering wheel 11 is rotatable by a driver of a vehicle. The steering shaft 10 is rotatably held by a rack housing 20 supported by a vehicle body. The steering shaft 10 rotates in response to rotation of the steering wheel 11. A second end of the steering shaft 10 is provided with a pinion 12. The pinion 12 is a component of a rack and pinion mechanism.

The rack shaft 13 extends in a vehicle width direction that corresponds to the axial direction A. A portion of the rack shaft 13 located adjacent to one of the ends of the rack shaft 13 is provided with a rack 14. The rack 14 and the pinion 12 are components of the rack and pinion mechanism. The pinion 12 of the steering shaft 10 and the rack 14 of the rack shaft 13 mesh with each other. When the vehicle driver rotates the steering wheel 11 (i.e., when the vehicle driver performs a steering operation), a torque is applied to the steering wheel 11. The steering shaft 10 transmits the torque to the rack shaft 13. The rack and pinion mechanism converts rotation of the steering shaft 10 into a rectilinear movement of the rack shaft 13 in the axial direction A. The rack shaft 13 moves in the axial direction A in response to the rotation of the steering shaft 10.

Tie rods 16 are each swingably coupled to an associated one of the axial ends of the rack shaft 13 through an associated ball joint 15. The steered wheels 18 are each coupled to an associated one of the tie rods 16 through an associated steering knuckle arm 17. Movement of the rack shaft 13 in the axial direction A steers the steered wheels 18. Steering the steered wheels 18 in this manner steers the vehicle to the right and/or left.

The steering system 1 further includes a ball screw mechanism 30, an electric motor 40, and a driving force transmission device 50. Using the electric motor 40 as a driving source, the steering system 1 is able to assist the vehicle driver in applying a steering torque to the steering wheel 11 so as to rotate the steering wheel 11. The electric motor 40 produces an assisting rotation torque. The ball screw mechanism 30 serves as a gear device. The steering system 1 transmits the assisting rotation torque to the ball screw mechanism 30 through the driving force transmission device 50. The ball screw mechanism 30 converts the assisting rotation torque to power that moves the rack shaft 13 rectilinearly in the axial direction A. This conversion provides an assisting force to the rack shaft 13 so as to assist the rack shaft 13 in steering the steered wheels 18. The steering system 1 is a "rack parallel type" electric power steering system.

The ball screw mechanism 30 includes a ball screw portion 31 and a ball screw nut (not illustrated). The ball screw portion 31 includes an outer peripheral groove. The outer peripheral groove is a spirally extending groove provided on the outer peripheral surface of the rack shaft 13. The ball screw nut is a cylindrical member extending in the axial direction A. The ball screw nut is disposed coaxially with the rack shaft 13. The ball screw nut includes an inner peripheral groove. The inner peripheral groove is a spirally extending groove provided on the inner peripheral surface of the ball screw nut. The outer peripheral groove of the ball screw portion 31 and the inner peripheral groove of the ball screw nut radially face each other. The outer peripheral groove of the ball screw portion 31 and the inner peripheral groove of the ball screw nut are in thread engagement with each other through a plurality of rolling balls infinitely circulated by a deflector (not illustrated) provided on the ball screw nut.

The rack shaft 13 is inserted through and held by the rack housing 20 such that the rack shaft 13 is movable in the axial direction A. The rack housing 20 is a substantially tubular housing extending in the axial direction A. The rack housing 20 covers and holds the rack shaft 13 such that the rack shaft 13 is movable in the axial direction A. The rack housing 20 includes an insertion hole 20a through which the rack shaft 13 is inserted. The rack housing 20 is made of, for example, aluminum. The rack housing 20 includes: a small diameter portion 21 having an inner diameter slightly larger than the outer diameter of the rack shaft 13; and a large diameter portion 22 having an inner diameter larger than the inner diameter of the small diameter portion 21.

A steering shaft insertion portion 23 is coupled to the small diameter portion 21. The steering shaft 10 is inserted through the steering shaft insertion portion 23. The ball screw mechanism 30 and the driving force transmission device 50 are housed in the large diameter portion 22. The large diameter portion 22 is provided with a ball screw chamber 24 containing, for example, the ball screw nut and the rolling balls. The large diameter portion 22 is disposed in a substantially axially central region of the rack housing 20. The rack housing 20 may be divided into a plurality of sub-housings. In this case, the sub-housings may be brought into and out of contact with each other in the axial direction A such that the ball screw nut of the ball screw mechanism 30 and the driving force transmission device 50 are housed in the large diameter portion 22.

The electric motor 40 is housed in a case 41 secured to a region of the rack housing 20 adjacent to the large diameter portion 22. The electric motor 40 is disposed such that its output shaft is in parallel with the axial direction A of the rack shaft 13. The electric motor 40 produces the assisting rotation torque in accordance with a command provided from an electronic control unit (ECU). The assisting rotation torque produced by the electric motor 40 is transmitted to the driving force transmission device 50.

The driving force transmission device 50 preferably includes: a driving pulley that is secured to the output shaft of the electric motor 40 and includes external teeth; a driven pulley that is secured to the ball screw nut of the ball screw mechanism 30 and includes external teeth; and an annular rubber belt including internal teeth meshing with the external teeth of the driving pulley and the driven pulley. When the assisting rotation torque is transmitted from the electric motor 40 to the driving force transmission device 50, the ball screw nut of the ball screw mechanism 30 is rotated while being supported by the large diameter portion 22 of the rack housing 20 via a bearing. This moves the rack shaft 13 in the axial direction A via the rolling balls.

The steering system 1 is configured such that a steering torque applied to the steering wheel 11 so as to rotate the steering wheel 11 is transmitted to the steering shaft 10, and resulting rotation of the steering shaft 10 moves the rack shaft 13 in the axial direction A through the rack and pinion mechanism including the pinion 12 and the rack 14. The steering torque transmitted to the steering shaft 10 is detected by a torque sensor, for example. The output of the electric motor 40 is controlled on the basis of, for example, the steering torque and the rotational position of the electric motor 40. The electric motor 40 produces an assisting rotation torque in accordance with a command provided from the electronic control unit (ECU). When the assisting rotation torque is produced by the electric motor 40, the rotation torque is transmitted to the ball screw mechanism 30 through the driving force transmission device 50. The ball screw mechanism 30 converts the rotation torque into a driving force that moves the rack shaft 13 in the axial direction A.

The movement of the rack shaft 13 in the axial direction A changes the orientation of the steered wheels 18 through the ball joints 15, the tie rods 16, and the steering knuckle arms 17. Thus, the steering system 1 is configured such that the steering torque, applied to the steering wheel 11 by the driver and transmitted to the steering shaft 10, and the assisting rotation torque, produced by the electric motor 40 and responsive to the steering torque, are provided to the rack shaft 13 so as to move the rack shaft 13 in the axial direction A. Consequently, the steering system 1 reduces a steering force necessary for the driver to rotate the steering wheel 11.

Figure 2:
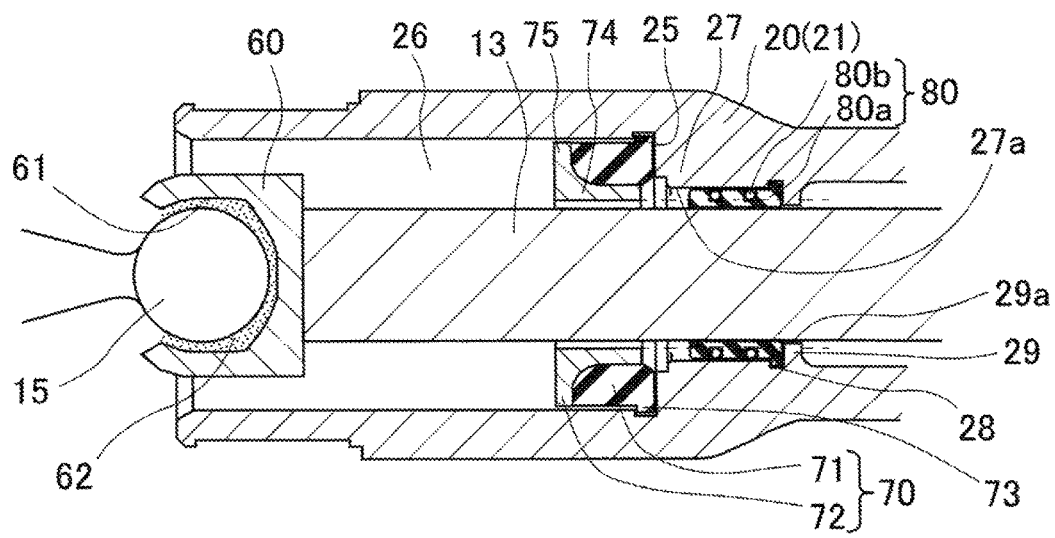
FIG. 2 is an enlarged cross-sectional view of main components of the steering system according to the present embodiment.
Figure 3:
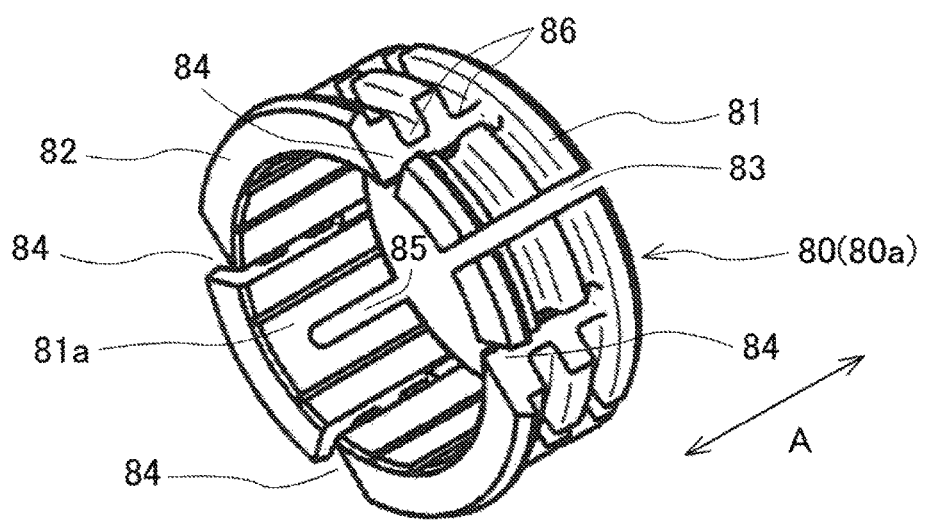
FIG. 3 is a perspective view of a steering operation shaft bushing of the steering system according to the present embodiment (with elastic rings detached therefrom)
Figure 4:
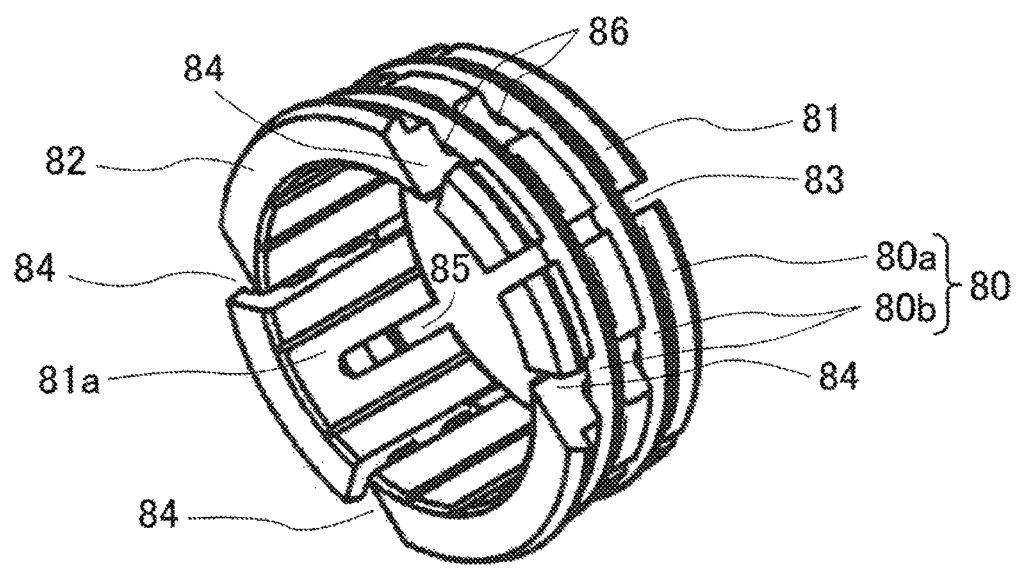
FIG. 4 is a perspective view of the steering operation shaft bushing of the steering system according to the present embodiment (with the elastic rings attached thereto)
Figure 5:
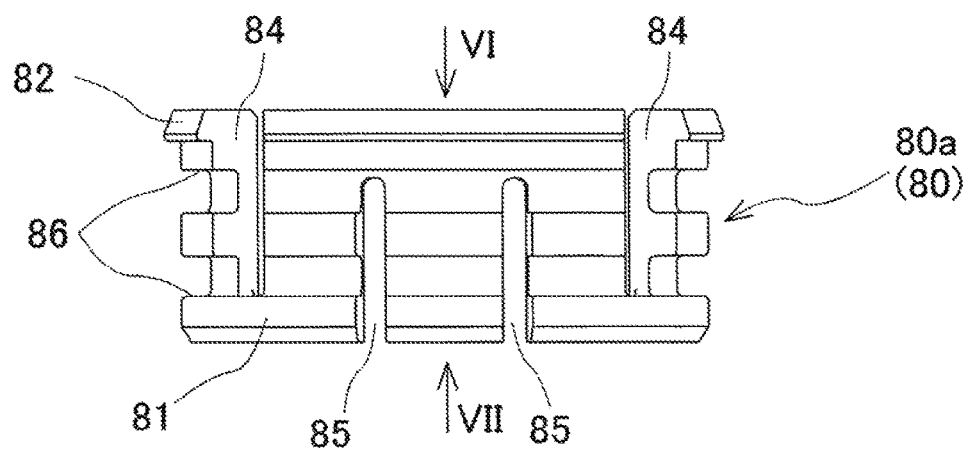
FIG. 5 is a side view of the steering operation shaft bushing according to the present embodiment (with the elastic rings detached therefrom)
Figure 6:
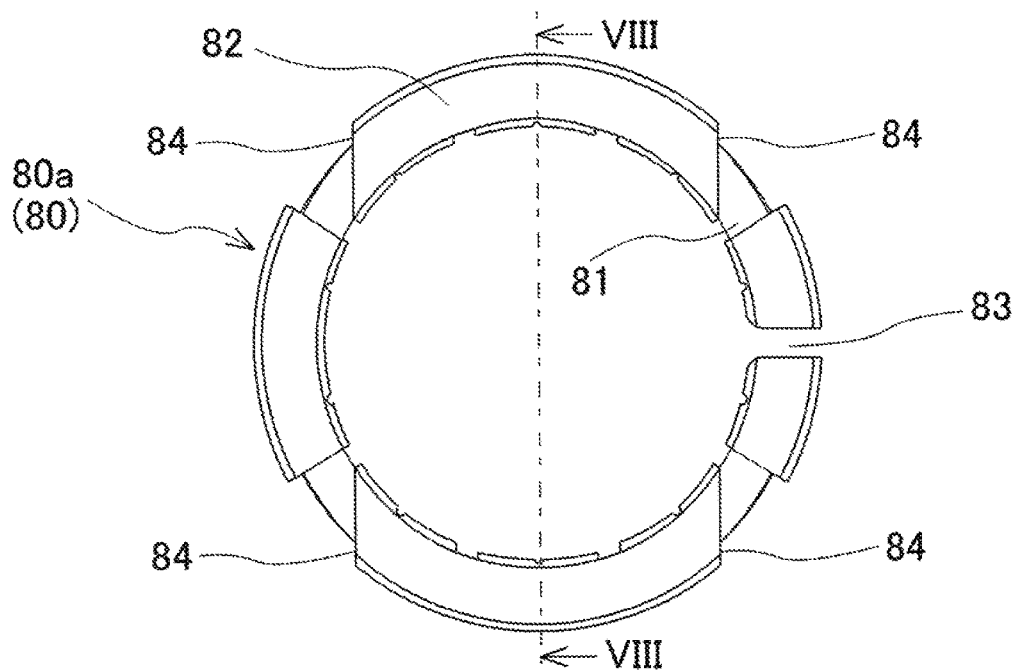
FIG. 6 is a diagram of the steering operation shaft bushing illustrated in FIG. 5, as viewed in the direction indicated by the arrow VI.
Figure 7:
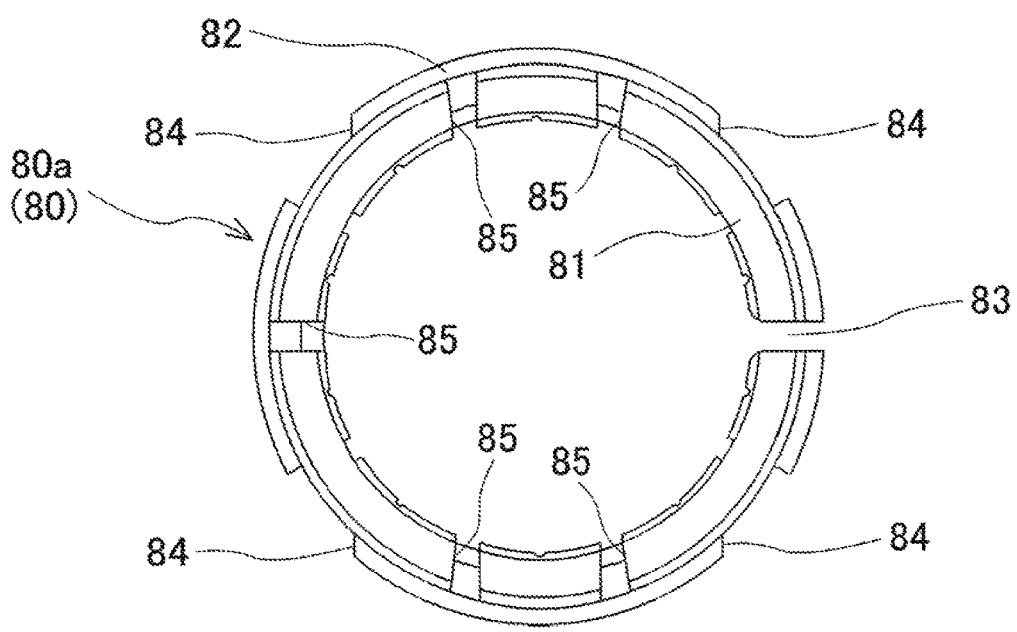
FIG. 7 is a diagram of the steering operation shaft bushing illustrated in FIG. 5, as viewed in the direction indicated by the arrow VII.
Figure 8:
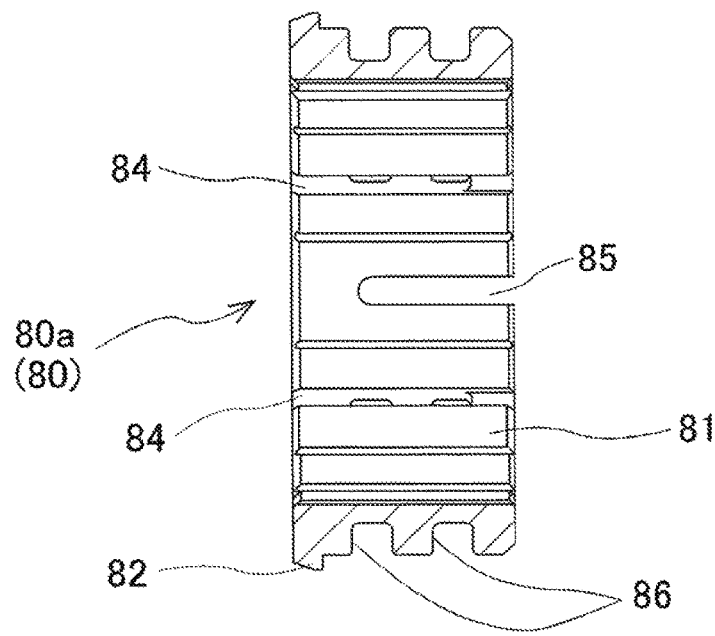
FIG. 8 is a cross-sectional view of the steering operation shaft bushing illustrated in FIG. 6, taken along the straight line VIII-VIII.
Figure 9:
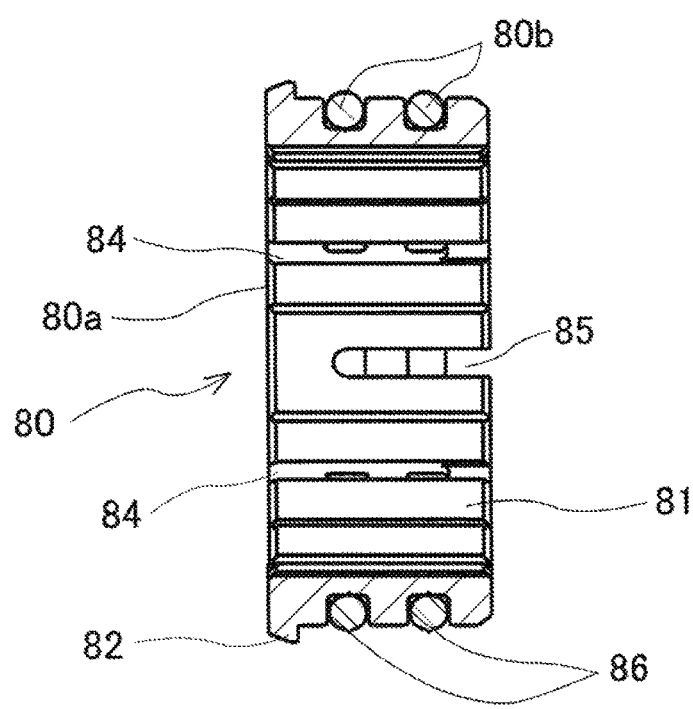
FIG. 9 is a cross-sectional view of the steering operation shaft bushing according to the present embodiment (with the elastic rings attached thereto), taken along the straight line VIII-VIII in FIG. 6.

As illustrated in FIG. 2, a large diameter member 60 is fitted to each of the axial ends of the rack shaft 13 of the steering system 1. Each large diameter member 60 is coaxially coupled to the rack shaft 13. Each large diameter member 60 has an outer diameter larger than the outer diameter of the rack shaft 13. Each large diameter member 60 is provided with a substantially spherical hole 61 that is open axially outward. A ball end of a ball stud that is a component of the ball joint 15 is rotatably housed in the hole 61, with a cushioning member 62 interposed between the ball joint 15 and the hole 61.

The axial ends of the rack housing 20 (or more specifically, the axially outer ends of the small diameter portion 21 of the rack housing 20) are each provided with a large diameter housing chamber 26 configured to house the associated large diameter member 60. Each large diameter housing chamber 26 has an inner diameter larger than the outer diameter of the associated large diameter member 60. The inner diameter of each large diameter housing chamber 26 is larger than the inner diameter of a body of the rack housing 20 (i.e., the diameter of the insertion hole 20a).

The rack housing 20 includes stoppers 27 protruding radially inward from the inner surface of the rack housing 20. Each stopper 27 extends radially inward from the cylindrical inner peripheral surface of the body of the rack housing 20 (or more specifically, the small diameter portion 21). Each stopper 27 has an annular shape. Each stopper 27 is provided on an associated one of the axial sides of the rack housing 20. Each stopper 27 functions to prevent the rack shaft 13 from moving beyond a predetermined stroke in the axial direction A. Each large diameter member 60 of the rack shaft 13 is disposed axially outward of the associated stopper 27.

Each stopper 27 is provided in its center with an insertion hole 27a through which the rack shaft 13 is inserted. Each insertion hole 27a has a circular shape conforming to the outer shape of the rack shaft 13. Each insertion hole 27a has a diameter larger than the outer diameter of the rack shaft 13 and smaller than the outer diameter of the associated large diameter member 60. Each stopper 27 is configured to abut against an axial end face of the associated large diameter member 60 so as to prevent the rack shaft 13, to which the large diameter member 60 is coupled, from moving beyond the predetermined stroke in the axial direction A. Each stopper 27 has an axial thickness necessary to withstand a pressing force from the associated large diameter member 60 so as to prevent movement of the rack shaft 13 beyond the predetermined stroke.

The steering system 1 further includes an end damper 70. The end damper 70 is a device to absorb impact produced when the axial end face of the large diameter member 60 abuts against the stopper 27 of the rack housing 20 in accordance with movement of the rack shaft 13 in the axial direction A. The end damper 70 absorbs the impact in this manner so as to prevent, for example, disengagement of belt teeth of the driving force transmission device 50. The end damper 70 is disposed axially outward of the stopper 27 (i.e., leftward of the stopper 27 in FIG. 2) such that the end damper 70 is adjacent to the stopper 27.

The end damper 70 includes: an annular elastic member 71 made of resin, for example; and a cylindrical plate member 72 made of metal, such as iron, and L-shaped in cross section. The elastic member 71 has elasticity. The elastic member 71 is held by the plate member 72 and integral with the plate member 72. The plate member 72 is configured to abut against the large diameter member 60 of the rack shaft 13, so that the plate member 72 is pressed in the axial direction A. The plate member 72 transmits impact to the elastic member 71 while applying a compressive force thereto. The compressive force is produced when the elastic member 71 is clamped between the plate member 72 and the stopper 27 of the rack housing 20. The end damper 70 is interposed between the stopper 27 of the rack housing 20 and the large diameter member 60 of the rack shaft 13. Thus, the end damper 70 damps, with its elastic member 71, an impact force produced when the rack shaft 13 abuts against the rack housing 20.

The elastic member 71 includes a protrusion 73 protruding radially outward from the outer peripheral surface of a body of the elastic member 71. The protrusion 73 is provided on a first axial end of the elastic member 71 (i.e., an axial end of the elastic member 71 adjacent to the stopper 27). The protrusion 73 has an annular shape on the outer peripheral surface of the elastic member 71. The elastic member 71 may include a plurality of protrusions 73. In this case, the protrusions 73 are disposed at regular intervals in the circumferential direction of the elastic member 71. Each large diameter housing chamber 26 of the rack housing 20 is provided with groove(s) 25 into which the protrusion(s) 73 of the elastic member 71 is/are fitted. The protrusion(s) 73 of the elastic member 71 is/are fitted to the groove(s) 25 of the rack housing 20. Thus, the protrusion(s) 73 of the elastic member 71 and the groove(s) 25 of the rack housing 20 function to effect positioning of the elastic member 71 in the axial direction A and eventually effect positioning of the plate member 72 in the axial direction A.

The steering system 1 further includes a rack bushing 80. The rack bushing 80 is provided adjacent to an associated one of the axial ends of the rack shaft 13. The rack bushing 80 is interposed between the outer surface of the rack shaft 13 and the inner surface of the rack housing 20 in a region of the insertion hole 20a adjacent to the axial end of the rack housing 20. The rack bushing 80 is a rack shaft guide bushing supporting the rack shaft 13 such that the rack shaft 13 is slidable in the axial direction A.

The steering system 1 may include a plurality of the rack bushings 80 each provided adjacent to an associated one of the axial ends of the rack shaft 13 or may include the rack bushing 80 provided adjacent to only one of the axial ends of the rack shaft 13. For example, suppose that the position at which the pinion 12 of the steering shaft 10 and the rack 14 of the rack shaft 13 mesh with each other is deviated toward one of the axial ends of the rack shaft 13. In such a case, the rack bushing 80 may be provided adjacent to only one of the axial ends of the rack shaft 13 because it may be unnecessary to provide the rack bushing 80 adjacent to the axial end of the rack shaft 13 where rigidity of the rack shaft 13 is maintained without the need for the rack bushing 80. The rack bushing 80 is particularly useful when the large diameter portion 22 of the rack housing 20, housing the ball screw mechanism 30 and the driving force transmission device 50, is disposed in an axial center of the rack housing 20.

The rack bushing 80 includes a bushing body 80a and elastic rings 80b. The bushing body 80a is made of synthetic resin, for example. As illustrated in FIGS. 3, 4, 5, 6, 7, 8, and 9, the bushing body 80a includes: a body tubular portion 81 having a substantially cylindrical shape; and a collar 82 protruding radially outward.

The body tubular portion 81 includes an insertion hole 81a. The rack shaft 13 is slidably inserted through the insertion hole 81a. The body tubular portion 81 is provided such that the body tubular portion 81 has a predetermined radial thickness. The collar 82 is integral with a first axial end of the body tubular portion 81. The first axial end of the body tubular portion 81 is the right end of the body tubular portion 81 in FIG. 2 and the left end of the body tubular portion 81 in FIGS. 3 and 4. The collar 82 is protruded radially outward from substantially the entire circumference of the outer surface of the body tubular portion 81. The outer diameter of the collar 82 is larger than the outer diameter of the body tubular portion 81. The collar 82 has a predetermined axial thickness.

The rack housing 20 includes an annular groove 28 on the inner surface of the rack housing 20. The annular groove 28 is provided closer to the axial center of the rack shaft 13 relative to the stopper 27 (i.e., axially inward of the stopper 27). The body of the rack housing 20 (or more specifically, the small diameter portion 21 of the rack housing 20) is provided such that the inner diameter of the inner surface thereof is substantially equal to the outer diameter of the body tubular portion 81 and smaller than the outer diameter of the collar 82 in a normal state where the rack shaft 13 is inserted through the insertion hole 81a of the rack bushing 80. In other words, the rack bushing 80 is provided such that in the normal state, the outer diameter of the body tubular portion 81 of the rack bushing 80 is substantially equal to the inner diameter of the inner surface of the body of the rack housing 20, and the outer diameter of the collar 82 of the rack bushing 80 is larger than the inner diameter of the inner surface of the body of the rack housing 20.

The annular groove 28 is a groove into which the collar 82 of the rack bushing 80 is fitted. The inner diameter of the bottom of the annular groove 28 is substantially equal to or slightly larger than the outer diameter of the collar 82 in the normal state. The rack bushing 80 is inserted into the insertion hole 20a from a position axially outward of the rack housing 20 (i.e., from a position axially leftward of the rack housing 20 in FIG. 2) such that the collar 82 is fitted into the annular groove 28 so as to effect positioning of the rack bushing 80 in the axial direction A. The rack bushing 80 is inserted into the insertion hole 20a such that the collar 82 is located closer to the axial center of the rack housing 20 than the other portions of the rack bushing 80 (e.g., an axially central portion of the rack bushing 80 and an axial end of the rack bushing 80 located opposite to the collar 82). In other words, the rack bushing 80 is inserted into the insertion hole 20a such that the collar 82 is located axially inward of the other portions of the rack bushing 80. The radial end of the collar 82 is tapered such that the collar 82 is increased in diameter from a first axial end of the collar 82 to a second axial end of the collar 82. The first axial end of the collar 82 axially faces in the direction of insertion of the rack bushing 80 into the insertion hole 20a of the rack housing 20. The second axial end of the collar 82 is located axially opposite to the first axial end of the collar 82.

The bushing body 80a includes a slit such that the outer diameter of the bushing body 80a is expandable and reducible across its entire circumference. In one example, the bushing body 80a is placed in an initial state where the outer diameter of the bushing body 80a is relatively large, and in this state, the bushing body 80a is pressed radially inward. This narrows the slit so as to cause the circumferential end faces of the bushing body 80a facing each other, with the slit located therebetween, to abut against each other, so that the outer diameter of the bushing body 80a decreases. Alternatively, the bushing body 80a may be placed in an initial state where the outer diameter of the bushing body 80a is relatively small, and in this state, the rack shaft 13 may be inserted through the insertion hole 81a so as to press the bushing body 80a radially outward. This causes the circumferential end faces of the bushing body 80a facing each other, with the slit located therebetween, to move away from each other, so that the outer diameter of the bushing body 80a increases.

The bushing body 80a includes a through slit 83 passing through the bushing body 80a in the axial direction A. Specifically, the through slit 83 is a gap defined in the periphery of the bushing body 80a such that the gap extends between a first axial end of the bushing body 80a whose axial position corresponds to the axial position of the collar 82 and a second axial end of the bushing body 80a opposite to the first axial end of the bushing body 80a. The through slit 83 is a slit passing through the axial end faces of the bushing body 80a. The through slit 83 is provided at one circumferential location on the bushing body 80a. The bushing body 80a has no separate parts and thus has a one-piece structure. The circumferential width of the through slit 83 may be determined such that when the through slit 83 is reduced in circumferential width and the circumferential end faces of the bushing body 80a facing each other, with the through slit 83 located therebetween, abut against each other, the outer diameter of the collar 82 of the bushing body 80a in the direction in which the circumferential end faces of the bushing body 80a face each other, with the through slit 83 located therebetween, is reduced by the circumferential width of the through slit 83 and is thus smaller than the inner diameter of the inner surface of the body of the rack housing 20.

The bushing body 80a includes two types of slits that do not pass through the bushing body 80a in the axial direction A, i.e., first non-through slits 84 and second non-through slits 85. Each first non-through slit 84 is a gap extending in the axial direction A such that the gap passes through the first axial end of the bushing body 80a whose axial position corresponds to the axial position of the collar 82. Each first non-through slit 84 passes through a first axial end face of the bushing body 80a (i.e., the right end face of the bushing body 80a in FIG. 2 and the left end face of the bushing body 80a in FIGS. 3 and 4) but does not pass through a second end face of the bushing body 80a (i.e., the left end face of the bushing body 80a in FIG. 2 and the right end face of the bushing body 80a in FIGS. 3 and 4). Thus, each first non-through slit 84 is closed at the second axial end of the bushing body 80a.

The first non-through slits 84 are circumferentially spaced from each other. In one example, the number of first non-through slits 84 is four. The first non-through slits 84 each having a predetermined circumferential width are provided at predetermined circumferential locations on the bushing body 80a such that the following requirements are satisfied. Each first non-through slit 84 is required to be provided such that when the first non-through slit 84 is narrowed and reduced in circumferential width and thus the circumferential end faces of the bushing body 80a facing each other, with the first non-through slit 84 located therebetween, abut against each other, the outer diameter of the collar 82 in a direction different from the direction in which the circumferential end faces of the bushing body 80a face each other, with the through slit 83 of the bushing body 80a located therebetween (or more specifically, the outer diameter of the collar 82 in any direction including a direction shifted by 90 degrees relative to the direction in which the circumferential end faces of the bushing body 80a face each other, with the first non-through slit 84 located therebetween), becomes smaller than the inner diameter of the inner surface of the body of the rack housing 20.

The through slit 83 and the first non-through slits 84 enable the outer diameter of the collar 82 to be reduced such that the outer diameter of the collar 82 is smaller than the inner diameter of the inner surface of the body of the rack housing 20 across the entire circumference of the bushing body 80a. Specifically, a length measured by subtracting the sum of the circumferential widths of the through slit 83 and the first non-through slits 84 from the circumferential length of the radial outer end of the collar 82 of the bushing body 80a is smaller than the circumferential length of the inner surface of the body of the rack housing 20. The circumferential length of the radial outer end of the collar 82 of the bushing body 80a includes the circumferential widths of the through slit 83 and the first non-through slits 84 when the bushing body 80a is in the normal state.

Each second non-through slit 85 is a gap extending in the axial direction A such that the gap does not pass through the first axial end of the bushing body 80a whose axial position corresponds to the axial position of the collar 82. Each second non-through slit 85 does not pass through the first axial end face of the bushing body 80a (i.e., the right end face of the bushing body 80a in FIG. 2 and the left end face of the bushing body 80a in FIGS. 3 and 4). Thus, each second non-through slit 85 is closed at the first axial end of the bushing body 80a. Each second non-through slit 85 passes through a second axial end face of the bushing body 80a (i.e., the left end face of the bushing body 80a in FIG. 2 and the right end face of the bushing body 80a in FIGS. 3 and 4).

The second non-through slits 85 are circumferentially spaced from each other. In one example, the number of second non-through slits 85 is five. Each second non-through slit 85 extends in the axial direction A between the circumferential positions of associated two of the first non-through slits 84 circumferentially adjacent to each other. When the through slit 83 is disposed between the circumferential positions of associated two of the first non-through slits 84 circumferentially adjacent to each other, it is unnecessary to dispose the second non-through slit 85 between the circumferential positions of these first non-through slits 84. The second non-through slits 85 function to facilitate insertion of the body tubular portion 81 of the rack bushing 80 into the insertion hole 20a of the rack housing 20 when the collar 82 of the rack bushing 80 is fitted into the annular groove 28 so as to effect positioning of the rack bushing 80 in the axial direction A, or function to facilitate narrowing of the first non-through slits 84 when the collar 82 is reduced in diameter.

The outer peripheral surface of the body tubular portion 81 of the bushing body 80a is provided with retaining grooves 86. Each retaining groove 86 extends in the circumferential direction of the body tubular portion 81. Each retaining groove 86 has an annular shape across the entire circumference of the body tubular portion 81. The retaining grooves 86 are provided adjacent to each other, with an interval therebetween in the axial direction A. The number of retaining grooves 86 is two. The elastic rings 80b are each retained in an associated one of the retaining grooves 86. The number of elastic rings 80b is two in accordance with the number of retaining grooves 86. Each elastic ring 80b is an annular member having a circular cross section, for example, such that each elastic ring 80b is fitted into the associated retaining groove 86. Each elastic ring 80b is an elastic member made of rubber or resin, for example. With each elastic ring 80b retained in the associated retaining groove 86, each elastic ring 80b has a size (or more specifically, an inner diameter) that allows each of the slits

83, 84, and 85 to have a predetermined circumferential width. The elastic rings 80b function to prevent an excessive increase in the diameter of the bushing body 80a, including the slits 83, 84, and 85, so as to ensure rigidity of the bushing body 80a when the bushing body 80a is increased in diameter. The elastic rings 80b also function to elastically hold the bushing body 80a inside the rack housing 20.

The rack housing 20 further includes a stopper 29 protruding radially inward from the inner surface of the rack housing 20. The stopper 29 is disposed adjacent to the annular groove 28 and located axially inward of the annular groove 28 (i.e., rightward of the annular groove 28 in FIG. 2). The stopper 29 extends radially inward from the cylindrical inner surface of the body of the rack housing 20 (or more specifically, the small diameter portion 21). The stopper 29 has an annular shape. An axial end face of the body tubular portion 81 of the rack bushing 80 may abut against the stopper 29. The stopper 29 abuts against the axial end face of the body tubular portion 81 and thus functions to prevent the rack bushing 80 whose collar 82 is fitted into the annular groove 28 (i.e., the rack bushing 80 held in place) from moving further axially inward.

The stopper 29 is provided in its center with an insertion hole 29a through which the rack shaft 13 is inserted. The insertion hole 29a has a circular shape conforming to the outer shape of the rack shaft 13. The insertion hole 29a has a diameter larger than the outer diameter of the rack shaft 13 and smaller than the diameter of the insertion hole 27a of the stopper 27. The stopper 29 has an axial thickness necessary to prevent the rack bushing 80 held in place from moving further axially inward.

The end damper 70 is disposed axially outward of the annular groove 28 of the rack housing 20 and the rack bushing 80 (i.e., leftward of the annular groove 28 of the rack housing 20 and the rack bushing 80 in FIG. 2). The plate member 72 of the end damper 70 includes a cylindrical portion 74. The cylindrical portion 74 has an inner diameter larger than the outer diameter of the rack shaft 13 and smaller than the outer diameter of the rack bushing 80. Although the outer diameter of the cylindrical portion 74 may be smaller than the outer diameter of the rack bushing 80, the outer diameter of the cylindrical portion 74 is preferably equal to or larger than the outer diameter of the rack bushing 80.

An axial end face of the cylindrical portion 74 is a facing portion that faces the outer axial end face of the rack bushing 80 (i.e., the left axial end face of the rack bushing 80 in FIG. 2) in the axial direction A. The cylindrical portion 74 and the rack bushing 80 are disposed such that the axial end faces of the cylindrical portion 74 and the rack bushing 80 facing each other are located at a distance from each other in the axial direction A. The distance is determined such that the axial end faces of the cylindrical portion 74 and the rack bushing 80 do not abut against each other even when the end damper 70 absorbs impact by elastic deformation of the elastic member 71. In an axial region between the axial end face of the cylindrical portion 74 and the axial end face of the rack bushing 80, a clearance is created between the inner surface of the rack housing 20 and the outer surface of the rack shaft 13. The radial length of the clearance is preferably substantially equal to the radial thickness of the rack bushing 80.

The plate member 72 includes a flange 75. The flange 75 is protruded radially outward from the outer surface of an axially outward region of the cylindrical portion 74 (i.e., an axially leftward region of the cylindrical portion 74 in FIG. 2). The flange 75 has an annular shape. The flange 75 is an abutment portion that abuts against the large diameter member 60 of the rack shaft 13.

The following description discusses a method for assembling the rack bushing 80 to the rack housing 20. In the present embodiment, assembling the rack bushing 80 to the rack housing 20 involves: inserting the rack bushing 80 into the insertion hole 20a from a position axially outward of the rack housing 20; and axially inwardly pushing the rack bushing 80. The rack bushing 80 is inserted into the insertion hole 20a and pushed axially inward such that the collar 82 is located axially inward. In other words, the rack bushing 80 is inserted into the insertion hole 20a and pushed axially inward such that the axial end of the rack bushing 80 provided with the collar 82 is located axially inward of the axial center of the rack bushing 80 inside the rack housing 20. In one example, the bushing body 80a is pressed radially inward so as to narrow the through slit 83 and the first non-through slits 84 and reduce the slits 83 and 84 in circumferential width, so that the circumferential end faces of the bushing body 80a facing each other, with the slits 83 and 84 located therebetween, abut against each other, i.e., so that the outer diameter of the bushing body 80a is reduced. In this state, the rack bushing 80 is inserted into the insertion hole 20a and pushed axially inward.

As described above, the inner diameter of the inner surface of the body of the rack housing 20 is substantially equal to the outer diameter of the body tubular portion 81 of the rack bushing 80 and smaller than the outer diameter of the collar 82, with the rack bushing 80 in the normal state. Thus, when the rack bushing 80 is still in the normal state where the bushing body 80a is not reduced in diameter, the outer diameter of the collar 82 is larger than the inner diameter of the inner surface of the body of the rack housing 20, so that the rack bushing 80 cannot be inserted into the insertion hole 20a of the rack housing 20 in this state.

To allow the insertion of the rack bushing 80 into the insertion hole 20a, the length measured by subtracting the sum of the circumferential widths of the through slit 83 and the first non-through slits 84 from the circumferential length of the radial outer end of the collar 82 of the bushing body 80a in the normal state is smaller than the circumferential length of the inner surface of the body of the rack housing 20 as previously described. Thus, when the through slit 83 and the first non-through slits 84 are narrowed such that the outer diameter of the bushing body 80a is smaller than that in the normal state, the outer diameter of the collar 82 is smaller than the inner diameter of the inner surface of the body of the rack housing 20. This enables the rack bushing 80, including the collar 82, to be inserted into the insertion hole 20a of the rack housing 20.

The rack bushing 80 is inserted into the rack housing 20 and pushed axially inward while the outer diameter of the bushing body 80a is smaller than that in the normal state. The rack bushing 80 is inserted into the rack housing 20 and pushed axially inward such that the collar 82 of the rack bushing 80 reaches an axial position where the collar 82 radially faces the annular groove 28 of the rack housing 20. In this state, for example, the action of radially inwardly pressing the bushing body 80a is stopped. Thus, elasticity of the rack bushing 80 itself causes the collar 82 to increase in diameter so as to allow the collar 82 to be fitted into the annular groove 28 of the rack housing 20. Then, the rack shaft 13 is inserted through the insertion hole 81a of the rack bushing 80. With the rack shaft 13 inserted through the insertion hole 81a, the collar 82 of the rack bushing 80 is further increased in diameter. With the collar 82 fitted into the annular groove 28, the rack bushing 80 is interposed between the outer surface of the rack shaft 13 and the inner surface of the rack housing 20. Thus, the rack bushing 80 supports the rack shaft 13 such that the rack shaft 13 is slidable in the axial direction A.

After the rack bushing 80 is assembled to the rack housing 20, the end damper 70 is assembled to the rack housing 20 prior to or subsequent to insertion of the rack shaft 13 into the insertion hole 81a. The end damper 70 is assembled to the rack housing 20 such that the axial end face of the cylindrical portion 74 faces the axial end face of the rack bushing 80, with a clearance created therebetween.

The following description discusses effects of the steering system 1 according to the present embodiment. The rack bushing 80 of the steering system 1 according to the present embodiment includes the collar 82 protruding radially outward from substantially the entire circumference of the outer surface of the first axial end of the body tubular portion 81. The rack bushing 80 includes: the through slit 83 passing through the rack bushing 80 in the axial direction A; and the first non-through slits 84 extending in the axial direction A. The through slit 83 and the first non-through slits 84 extend in the axial direction A such that the through slit 83 and the first non-through slits 84 pass through a portion of the rack bushing 80 whose axial position corresponds to the axial position of the collar 82. Thus, the through slit 83 and the first non-through slits 84 are narrowed and reduced in circumferential width so as to reduce the outer diameter of the collar 82 across its entire circumference.

The through slit 83 and the first non-through slits 84 enable the outer diameter of the collar 82 to be reduced such that the outer diameter of the collar 82 is smaller than the inner diameter of the inner surface of the body of the rack housing 20 across the entire circumference of the bushing body 80a. Specifically, the length measured by subtracting the sum of the circumferential widths of the through slit 83 and the first non-through slits 84 from the circumferential length of the radial outer end of the collar 82 of the bushing body 80a in the normal state is smaller than the circumferential length of the inner surface of the body of the rack housing 20. Accordingly, when the through slit 83 and the first non-through slits 84 are narrowed, the outer diameter of the collar 82 is reliably smaller than the inner diameter of the inner surface of the body of the rack housing 20.

Thus, when the rack bushing 80 is assembled to the rack housing 20, the rack bushing 80, including the collar 82, is reliably and easily inserted into the insertion hole 20a of the rack housing 20. Consequently, the present embodiment facilitates operations involved in assembling the rack bushing 80 to the rack housing 20, so that the rack bushing 80 is reliably assembled to the rack housing 20.

In particular, the present embodiment involves inserting the rack bushing 80 into the insertion hole 20a such that the collar 82 is located axially inward inside the rack housing 20. Thus, the outer diameter of the collar 82 needs to be reduced such that the outer diameter of the collar 82 is reliably smaller than the inner diameter of the inner surface of the body of the rack housing 20 in order to suitably assemble the rack bushing 80 to the rack housing 20. As described above, the steering system 1 enables the outer diameter of the collar 82 to be reduced such that the outer diameter of the collar 82 is reliably smaller than the inner diameter of the inner surface of the body of the rack housing 20. Consequently, if the collar 82 is to be disposed axially inward inside the rack housing 20, the present embodiment would facilitate operations involved in assembling the rack bushing 80 to the rack housing 20, so that the rack bushing 80 is reliably assembled to the rack housing 20.

The rack bushing 80 (or more specifically, the bushing body 80a having a substantially cylindrical shape) is a guide bushing provided with only one through slit 83 passing through the rack bushing 80 in the axial direction A. In other words, the through slit 83 is the only one slit that passes through the bushing body 80a in the axial direction A. Thus, the bushing body 80a of the rack bushing 80 to support the rack shaft 13 such that the rack shaft 13 is slidable in the axial direction A does not have to be separated into two or more bushing pieces. This allows the bushing body 80a having a substantially cylindrical shape to be used as a one-piece member.

Accordingly, the steering system 1 enables the rack bushing 80 to be easily and reliably assembled to the rack housing 20 without separating the bushing body 80a of the rack bushing 80 into two or more bushing pieces. Because the bushing body 80a is not separated into two or more bushing pieces, the present embodiment does not complicate operations involved in assembling the rack bushing 80 to the rack housing 20. If a bushing body is separated into two or more bushing pieces, each bushing piece may be deviated to one side in a circumferential direction. The present embodiment, however, makes it unlikely that such deviation will occur. Consequently, the present embodiment reduces or eliminates uneven wearing of the rack bushing 80 and sounds produced when the rack shaft 13 and the rack bushing 80 hit against each other.

The rack bushing 80 includes, in addition to the through slit 83 and the first non-through slits 84, the second non-through slits 85 extending in the axial direction A. Each second non-through slit 85 is a gap extending in the axial direction A such that the gap does not pass through the first axial end of the bushing body 80a whose axial position corresponds to the axial position of the collar 82. Thus, the second non-through slits 85 facilitate a reduction in the diameter of the body tubular portion 81 of the rack bushing 80. Consequently, the second non-through slits 85 facilitate insertion of the body tubular portion 81 of the rack bushing 80 into the insertion hole 20a of the rack housing 20.

The second non-through slits 85 each extend in the axial direction A between the circumferential positions of associated two of the first non-through slits 84 circumferentially adjacent to each other. Thus, the second non-through slits 85 each cause the circumferential end faces of the rack bushing 80 facing each other, with the first non-through slit 84 located therebetween, to abut against each other smoothly. This facilitates narrowing of the first non-through slits 84 when the collar 82 is reduced in diameter. Consequently, the second non-through slits 85 facilitate insertion of the collar 82 of the rack bushing 80 into the insertion hole 20a of the rack housing 20.

In the normal state, the collar 82 of the rack bushing 80 has an outer diameter larger than the outer diameter of the body tubular portion 81 of the rack housing 20. The collar 82 of the rack bushing 80 is fitted into the annular groove 28 having an inner diameter substantially equal to or slightly larger than the outer diameter of the collar 82. The radial end of the collar 82 is tapered such that the collar 82 is increased in diameter from the first axial end of the collar 82 to the second axial end of the collar 82. The first axial end of the collar 82 axially faces in the direction of insertion of the rack bushing 80 into the insertion hole 20a of the rack housing 20. The second axial end of the collar 82 is located axially opposite to the first axial end of the collar 82. This facilitates insertion of the collar 82 into the insertion hole 20a when the rack bushing 80 is inserted into the insertion hole 20a (or more specifically, the insertion hole 27a) so as to assemble the rack bushing 80 to the rack housing 20.

The steering system 1 is configured such that the collar 82 of the rack bushing 80 is fitted into the annular groove 28 of the rack housing 20 so as to effect positioning of the rack bushing 80 in the axial direction A. This prevents disengagement of the rack bushing 80 from the rack housing 20 in the axial direction A when the rack shaft 13 inserted through the insertion hole 81a of the rack bushing 80 slides in the axial direction A.

The rack housing 20 includes the stopper 29 provided adjacent to the annular groove 28 and located axially inward of the annular groove 28. The stopper 29 protrudes radially inward from the cylindrical inner surface of the rack housing 20. The axial end face of the rack bushing 80 may abut against the stopper 29. Thus, when the axial end face of the rack bushing 80 abuts against the stopper 29 of the rack housing 20, the rack bushing 80 is prevented from moving further axially inward. This reliably prevents disengagement of the rack bushing 80 from the rack housing 20 in the axially inward direction.

The steering system 1 includes the end damper 70 disposed axially leftward of the annular groove 28 of the rack housing 20 in FIG. 2. The elastic member 71 of the end damper 70 is fitted into the groove 25 of the rack housing 20 so as to effect positioning of the end damper 70 in the axial direction A. This prevents disengagement of the end damper 70 from the rack housing 20 in the axial direction A. The end damper 70 includes the cylindrical portion 74. The cylindrical portion 74 is provided such that the axial end face of the cylindrical portion 74 faces the axial end face of the rack bushing 80 in the axial direction A. The axial end face of the cylindrical portion 74 is the facing portion that faces the axial end face of the rack bushing 80 in the axial direction A. Thus, when the axial end face of the rack bushing 80 abuts against the axial end face of the cylindrical portion 74 of the end damper 70, the rack bushing 80 is prevented from moving further axially leftward in FIG. 2. This reliably prevents disengagement of the rack bushing 80 from the rack housing 20 in the axially leftward direction in FIG. 2.

As described above, the steering system 1 according to the present embodiment enables the end damper 70 to function as a stopper that prevents disengagement of the rack bushing 80 from the rack housing 20 in the axial direction A (or more specifically, in the axially leftward direction in FIG. 2). Thus, a dedicated annular member to provide the stopper function does not have to be fitted or press-fitted to the rack housing 20. This reduces the number of components of the steering system 1, resulting in a reduction in the number of manufacturing steps and a reduction in manufacturing cost.

In the present embodiment, the collar 82 of the rack bushing 80 is provided on the first axial end of the rack bushing 80, and each first non-through slit 84 passes through the first axial end face of the rack bushing 80 and is closed at the second axial end of the rack bushing 80. The invention, however, is not limited to this arrangement. Alternatively, the collar 82 of the rack bushing 80 may be provided on the axially central portion of the rack bushing 80, and each first non-through slit 84 may extend in the axial direction A such that each first non-through slit 84 passes through at least a portion of the rack bushing 80 whose axial position corresponds to the axial position of the collar 82. Each first non-through slit 84 may be closed at the first and second axial ends of the rack bushing 80. In this case, each first non-through slit 84 does not pass through the first axial end face of the rack bushing 80 or the second axial end face of the rack bushing 80.

In the present embodiment, the first non-through slits 84 are circumferentially spaced from each other. The invention, however, is not limited to this arrangement. Alternatively, only one first non-through slit 84 may be provided at a circumferential location on the rack bushing 80 when the first non-through slit 84 allows the outer diameter of the collar 82 to be reduced such that the outer diameter of the collar 82 is smaller than the inner diameter of the inner surface of the body of the rack housing 20 across the entire circumference of the rack bushing 80.

In the present embodiment, the rack bushing 80 is inserted into the insertion hole 20a such that the axial end of the rack bushing 80 provided with the collar 82 is located closer to the axial center of the rack housing 20 than the axially central portion of the rack bushing 80 (i.e., axially inward of the axially central portion of the rack bushing 80). The annular groove 28 of the rack housing 20 is disposed at an axially inward position in an axial region where the rack bushing 80 is disposed in the insertion hole 20a. The annular groove 28 is disposed adjacent to the stopper 29 such that the annular groove 28 is located axially leftward of the stopper 29 in FIG. 2. The invention, however, is not limited to this arrangement. Alternatively, the rack bushing 80 may be inserted into the insertion hole 20a such that the axial end of the rack bushing 80 provided with the collar 82 is located closer to an axial end of the rack housing 20 than the axially central portion of the rack bushing 80 (i.e., axially leftward of the axially central portion of the rack bushing 80 in FIG. 2). In this case, the annular groove 28 of the rack housing 20 may be disposed at an axially leftward position in an axial region where the rack bushing 80 is disposed in the insertion hole 20a, such that the annular groove 28 is disposed axially leftward of the stopper 29 in FIG. 2, with an interval between the annular groove 28 and the stopper 29.

In the present embodiment, the rack shaft 13 that is a component of the rack and pinion mechanism is used as a steering operation shaft to change the orientation of steered wheels. The invention, however, is not limited to this arrangement. Alternatively, a shaft provided with no rack teeth may be used as a steering operation shaft to change the orientation of steered wheels. This shaft may be used in a steering system serving as a steer-by-wire system provided with no pinion on an end of a steering shaft.

What is claimed is:

1. A steering system comprising:
   a steering operation shaft coupled to a steered wheel, the steering operation shaft being configured to move in an axial direction thereof so as to change an orientation of the steered wheel;
   a tubular housing including an insertion hole through which the steering operation shaft is disposed, the housing holding the steering operation shaft such that the steering operation shaft is movable in the axial direction; and
   a tubular steering operation shaft bushing interposed between an outer surface of the steering operation shaft and an inner surface of the housing in a region of the insertion hole adjacent to an axial end of the housing, the steering operation shaft bushing supporting the steering operation shaft such that the steering operation shaft is slidable in the axial direction, wherein
   the housing includes an annular groove on the inner surface of the housing, and
   the steering operation shaft bushing includes a collar protruding radially outward from substantially an entire circumference of the steering operation shaft bushing, the collar being fitted into the annular groove, a through slit passing through the steering operation shaft bushing in the axial direction, and at least one first non-through slit extending in the axial direction such that the at least one first non-through slit passes through a portion of the steering operation shaft bushing whose axial position corresponds to an axial position of the collar, the at least one first non-through slit being closed at at least one of axial ends of the steering operation shaft bushing.

2. The steering system according to claim 1, wherein the collar is disposed on a first axial end of the steering operation shaft bushing, and the at least one first non-through slit includes a plurality of first non-through slits passing through a first axial end face of the steering operation shaft bushing, the first non-through slits being disposed at intervals in a circumferential direction of the steering operation shaft bushing.

3. The steering system according to claim 2, wherein the steering operation shaft bushing includes a second non-through slit extending in the axial direction between circumferential positions of the first non-through slits adjacent to each other in the circumferential direction, and the second non-through slit passes through a second axial end face of the steering operation shaft bushing.

4. The steering system according to claim 1, wherein a length measured by subtracting a sum of circumferential widths of the through slit and the at least one first non-through slit from a circumferential length of a radial outer end of the collar of the steering operation shaft bushing is smaller than a circumferential length of the inner surface of the housing.

5. The steering system according to claim 1, wherein the housing includes a stopper disposed axially inward of the annular groove, the stopper protruding radially inward from the inner surface of the housing.

6. The steering system according to claim 5, further comprising an end damper, wherein the end damper includes an elastic member disposed axially outward of the annular groove, the elastic member having an annular shape, and a cylindrical plate member holding the elastic member, the end damper is configured to absorb impact produced when the steering operation shaft abuts against the housing, and the plate member includes a facing portion that faces an axial end face of the steering operation shaft bushing in the axial direction.

7. The steering system according to claim 1, wherein the steering operation shaft bushing is disposed such that an axial end of the steering operation shaft bushing provided with the collar is located axially inward of an axially central portion of the steering operation shaft bushing in the housing.

8. The steering system according to claim 1, wherein a radial end of the collar is tapered such that the collar is increased in diameter from a first axial end of the collar to a second axial end of the collar, the first axial end axially facing in a direction of insertion of the steering operation shaft bushing into the housing, the second axial end being axially opposite to the first axial end.

* * * * *